April 12, 1927.
G. VAN YAHRES
1,624,820
METHOD OF FILLING TREE CAVITIES AND THE FILLING ITSELF
Filed Nov. 5, 1925 2 Sheets-Sheet 1
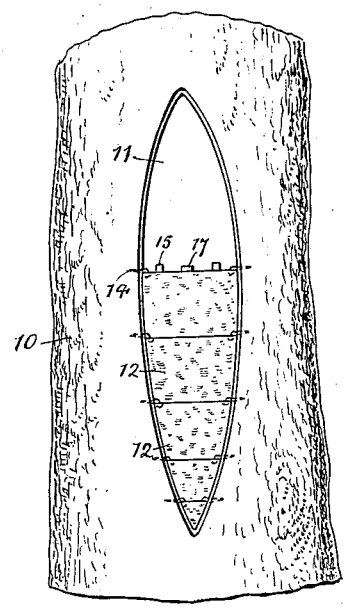
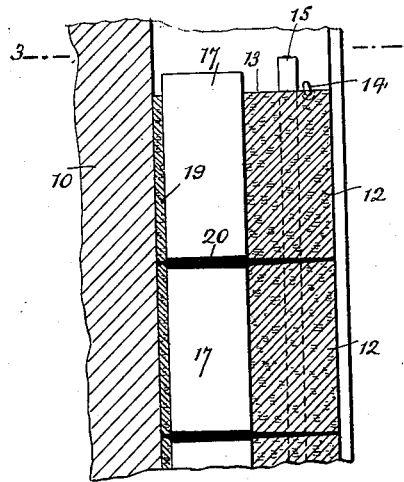
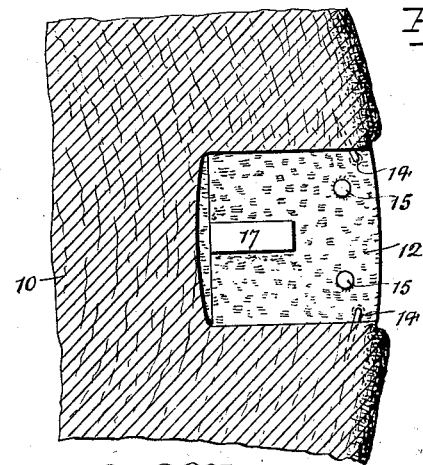
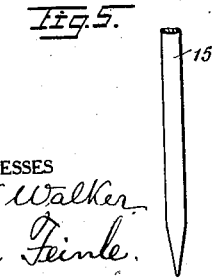
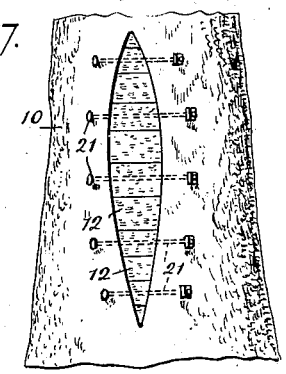
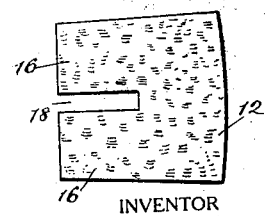
WITNESSES
H. T. Walker
Chris Feinle
INVENTOR
George Van Yahres
BY Munn & Co
ATTORNEYS April 12, 1927.    G. VAN YAHRES    1,624,820
METHOD OF FILLING TREE CAVITIES AND THE FILLING ITSELF
Filed Nov. 5, 1925    2 Sheets-Sheet 2
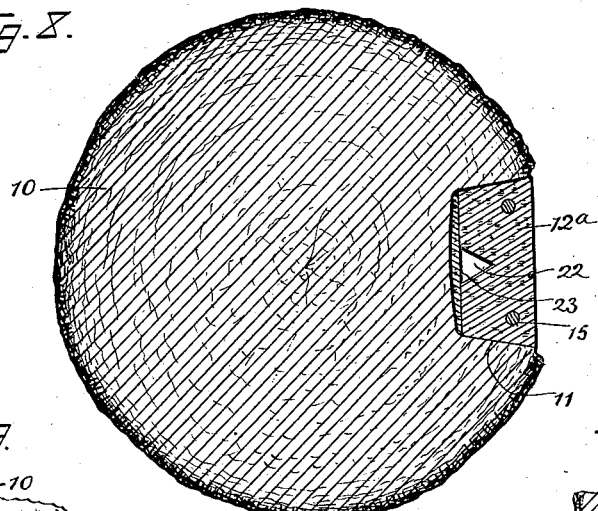
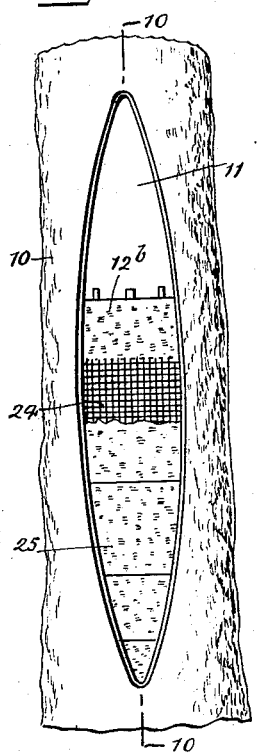
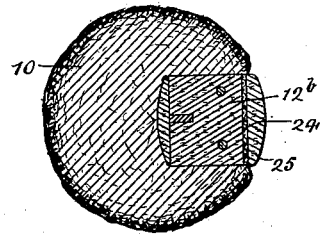
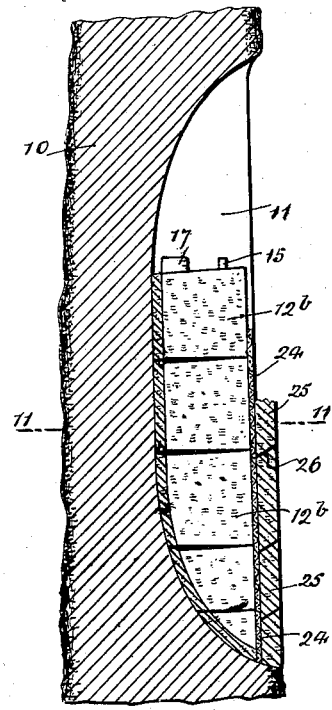
INVENTOR
George Van Yahres Patented Apr. 12, 1927.

1,624,820

UNITED STATES PATENT OFFICE.

GEORGE VAN YAHRES, OF WESTBURY, NEW YORK.

METHOD OF FILLING TREE CAVITIES AND THE FILLING ITSELF.

Application filed November 5, 1925. Serial No. 67,075.

This invention relates to the art of tree surgery, the method of filling a cavity in a part of a tree, and the filling itself.

One of the objects of the present invention is to carry out the cavity filling operations by the practice of a new and novel method which results in a more thoroughly efficient and effectual treatment of and remedy for decayed portions of trees.

Another object of the invention is to provide a filling in a cavity in a part of a tree which will be susceptible to the natural expansion and contraction of the adjoining portions of the tree, which will have a better affinity to the tree characteristics so as to prolong the life of the tree.

Another object of the present invention is to render the filling proof against destruction by insects and birds and other mites, which bore into the tree.

Another object of the invention is to utilize conformable elastic filler pieces of material such as cork normally over size so that when the pieces are arranged in the cavity to be filled they will impinge against the walls of the cavity and fit tightly therein and conform to the walls thereof.

Other objects of the invention, its nature, and distinguishing features and advantages will appear when the following specification is read in conjunction with the accompanying drawings, in which—

Figure 1 is a front elevation of a portion of a tree trunk, the cavity therein being partly filled in accordance with the present invention.

Fig. 2 is a fragmentary vertical sectional view through a portion of a tree trunk, and showing a plurality of the filler pieces in place in the cavity, on an enlarged scale.

Fig. 3 is a transverse sectional view taken on the line 3—3 of Fig. 2.

Fig. 4 is an elevation of one of the wedges employed for expanding the inner portions of one of the filler pieces.

Fig. 5 is an elevation of a portion of one of the pins employed for joining contiguous filler pieces.

Fig. 6 is a top plan view of one of the filler pieces.

Fig. 7 is a side elevation of a portion of a tree trunk whose cavity is filled with filler pieces held therein by the use of a modified form of retaining means.

Fig. 8 is a transverse sectional view illustrating a further modification of the present invention.

Fig. 9 is an elevation illustrating the means employed for rendering the filler pieces proof against insects and birds.

Fig. 10 is a vertical sectional view taken on the line 10—10 of Fig. 9.

Fig. 11 is a transverse sectional view taken on the line 11—11 of Fig. 10.

In accordance with the present invention a cavity in a part of a tree is thoroughly cleaned of all decayed and soft wood, the cavity is then shaped, sterilized, and waterproofed with a special paint or dressing. A portion of the tree is indicated at 10 and the cavity to be filled in accordance with the method of the present invention and the means employed, presently to be described, is indicated at 11. Use is made of a suitable conformable elastic material, and in the present instance this material is cork which is specially treated. The said material is cut into blocks 12 which are fitted from the bottom of the cavity to the top, and which are adapted to be inserted into the cavity, and to elastically conform to the walls thereof. It will, therefore, be understood that the blocks 12 will be of divers shapes and sizes and the desired thickness to reach well into the cavity, and each of the blocks is cut sllightly over size. Prior to the emplacement of the blocks, which are to be put into the cavity one at a time, each block is dipped into a hot tree mastic and held therein until it is softened. The block is then forced down into the cavity allowing the outside portion thereof to extend out at least one-sixteenth of an inch for trimming and shaping the exposed surface. After each block is set in place and before the tree mastic has hardened, the block is spiked to the side wall of the cavity, which is accomplished by the use of elements 14, such as nails; or any other suitable means such as glazier points which are partly driven into the side walls of the cavity and are then pounded down against the top of the block so as to compress the same and make it fit tightly. The top of each block is slightly beveled rearwardly as at 13 so that after the block is in place, hot mastic is poured over the block to fill the portion of the cavity behind the block; the bevel preventing any of the mastic from coming out. After the top of the first block is well covered with the mastic, the second block is dipped in the manner explained and is forced down on top of the first block. The second block is then firmly pinned to the first block by the use of suitable pins, such as wooden skewers 15, any number of which may be used and which extend through the contiguous blocks. These pins effect a compressing action and combined with the mastic make a solid and firm joint or union between the blocks, so that the joint or union will prevent cracking or breaking. The required number of blocks are placed in the cavity until the same is filled which will result in a solid structural integrality. If desired, and as will be done in some cases, the inner portions 16 of each block will be expanded by the use of suitable wooden wedges 17 which are driven down between the portions 16, as shown most clearly in Figs. 2 and 3. This is accomplished after each block is set in place. Each block 12 may be cut out as shown at 18 in Fig. 6 to accommodate a wedge or the wedge may be driven home without cutting out the block. By using a wedge the inner portion of each block will be impinged against the side walls of the cavity 11 to effectually secure the block in place. After all of the blocks are in place the outer surfaces thereof are trimmed by the use of a suitable cutting tool, the trimmed surfaces are then rubbed with rough sand paper so as to smooth the same after which the entire outer surface of the filling is given a coating of hot paraffine dressing.

The top or last block inserted may be held in place by the use of suitable fastening elements which are driven in and pounded back against the block to prevent the same from coming out because it will be impossible to employ pins such as the pins 15. On reference to Fig. 2, it will be apparent the space between the wall of the cavity and the back portions of the blocks is filled with the special waterproofing paint or dressing and also some of the mastic and is indicated at 19. The mastic between contiguous blocks is indicated at 20.

As shown in Fig. 7 means may be employed for bolting or reinforcing the cavity and at the same time to hold the filler blocks in place and this is accomplished by the use of bolts 21 which are employed by drilling holes through the side walls of the cavity and through the filling, the bolts being arranged in the holes after which the nuts are applied to tightly draw up the side walls and to compress the filling. These bolts may be used with or without the other features of the invention set forth hereinbefore.

As shown in Fig. 8 blocks $12^a$ are arranged in the cavity and each of the blocks will be cut out as at 22. The back of each block will have attached to the inside thereof a thin slice of cork 23 which will prevent the cut out 22 from being filled by tree mastic, and compensates for expansion due to the tree swelling in cold weather.

It is to be understood that certain trees require a certain type of filling, therefore, in some cases certain features will be omitted while others are employed. The features of the invention may be diversely employed to meet the particular requirements according to the size of the cavity to be filled.

As shown in Figs. 9, 10, and 11 the blocks $12^b$ are proofed against insects and birds by the use of a wire mesh 24 which serves as a protecting armor. Each of the blocks $12^b$ is cut and fitted so that they will all combine to fill the cavity after which the blocks are removed. If desired each block may be numbered. Each block $12^b$ is then dipped in hot tree mastic and the piece of wire mesh is stuck to the same or fastened in any other suitable manner. A comparatively thin piece of cork 25 is arranged over the wire mesh and is securely held by virtue of the mastic. If desired, these pieces 25 may also be pinned to their related blocks $12^b$. Each block $12^b$, its wire mesh 24, and piece 25 will constitute a unit when arranged in the cavity in the manner explained hereinbefore. It is to be noted that each of the pieces 25 is beveled as at 26 to prevent the mastic used from coming out as the units are pressed in place, and that each of the pieces 25 will be outermost, to constitute an outside covering piece for its related block $12^b$.

In connection with the claims it is to be understood that all rights under the doctrine of equivalents are reserved, as well as the making of changes, alterations, and modifications deemed necessary or advisable.

What I claim is—

1. The method of filling a cavity in a part of a tree which consists in shaping and cleaning a cavity, utilizing over size blocks of conformable elastic material to fill the cavity, softening each of the blocks prior to its being put into its place in the cavity, joining each block to a contiguous block after being put in place in the cavity, applying a binder between opposing faces of the blocks, compressing each block after being put into its place in the cavity, trimming the protruding portions of the blocks, and finally dressing the blocks with a waterproofing to complete the filling.

2. The method of filling a cavity in a part of a tree which consists in shaping and cleaning the cavity, utilizing over size blocks of cork to fill the cavity, softening each of the blocks prior to its being put into its place in the cavity, joining each block to a contiguous block after being put in place in the cavity, applying a binder between opposing faces of the blocks, compressing each block after being put into its place in the cavity, trimming the protruding portions of the blocks, and finally dressing the blocks with a waterproofing to complete the filling.

3. The method of filling a cavity in a part of a tree which consists in shaping and cleaning the cavity, utilizing over size blocks of conformable elastic material to fill the cavity, softening each of the blocks prior to its being put into its place in the cavity, joining each block to a contiguous block after being put in place in the cavity, applying a binder between opposing faces of the blocks, compressing each block after being put into its place in the cavity by expanding inner portions thereof, trimming the protruding portions of the blocks, and finally dressing the blocks with a waterproofing to complete the filling.

4. The method of filling a cavity in a part of a tree which consists in shaping and cleaning the cavity, utilizing over size blocks of cork to fill the cavity, softening each of the blocks prior to its being put into its place in the cavity, joining each block to a contiguous block after being put in place in the cavity, applying a binder between opposing faces of the blocks, compressing each block after being put into its place in the cavity by drawing the walls of the cavity together, trimming the protruding portions of the blocks, and finally dressing the blocks with a waterproofing to complete the filling.

5. The method of filling a cavity in a part of a tree which consists in shaping and cleaning the cavity, utilizing blocks of cork to fill the cavity, joining the blocks together after being put in place in the cavity by the use of pins, compressing the side walls of the cavity to the filling, trimming the protruding portions of the blocks, and applying a waterproofing material to the outer trimmed surfaces of the blocks to complete the filling.

6. That improvement in the method of filling a cavity in a part of a tree which consists in utilizing conformable elastic filler blocks and in expanding the inner portions of the cavity filler blocks by the use of wedges.

7. That improvement in the method of filling a cavity in a part of a tree which consists in utilizing conformable elastic filler blocks and in expanding portions of each filler block by the use of a wedge driven into the filler block.

8. That improvement in the method of filling a cavity in a part of a tree which consists in utilizing conformable elastic filler blocks, in expanding the inner portions of the filler blocks by the use of wedges, and in joining the filler blocks by the use of means which extends through upper and lower contiguous filler blocks.

9. That improvement in the method of filling a cavity in a part of a tree which consists in utilizing conformable elastic filler blocks, in expanding the inner portions of the filler blocks by the use of wedges, and in joining the filler blocks by the use of pins.

10. That improvement in the method of filling a cavity in a part of a tree which consists in providing filler pieces which are first fitted to the cavity, which pieces are then removed from the cavity, then providing each filler piece with a protecting means, then covering the protecting means of each filler piece with an outer cover piece, and then placing each of the units formed into the cavity and securing the same therein.

11. That improvement in the method of filling a cavity in a part of a tree which consists in utilizing conformable elastic filler pieces, softening the filler pieces to render them more compressible, then placing the filler pieces in the cavity, and securing the filler pieces in the cavity.

12. That improvement in the method of filling a cavity in a part of a tree which consists in utilizing blocks of cork, and in expanding inner portions of each block by the use of a wedge driven between the inner portions of each block.

13. In conjunction with a part of a tree having a cavity therein, a filling for the cavity comprising conformable elastic blocks, and means which causes the impingement of side portions of each block against the opposite walls of the cavity.

14. In conjunction with a part of a tree having a cavity therein, a filling for the cavity comprising blocks of compressible and expansible material fitted in said cavity, and wedges for compressing the inner portions of each of said blocks to cause the same to impinge against the side walls of the cavity to secure the blocks in place in the cavity.

15. In conjunction with a part of a tree having a cavity therein, a filling for the cavity comprising blocks of compressible material fitted in said cavity, means for compressing inner portions of each of said blocks to cause the same to impinge against the side walls of the cavity to secure the blocks in place in the cavity, and armor inserted in each block.

16. In conjunction with a part of a tree having a cavity therein, a filling of cork blocks in the cavity completely filling the same.

17. In conjunction with a part of a tree having a cavity therein, a filling of cork blocks in the cavity completely filling the same, and means for holding the blocks in place.

GEORGE VAN YAHRES.